United States Patent
Jones

(10) Patent No.: US 9,135,656 B2
(45) Date of Patent: Sep. 15, 2015

(54) METHOD AND SYSTEM FOR AUCTION INFORMATION MANAGEMENT

(75) Inventor: David N. Jones, Branson, MO (US)

(73) Assignee: STRATEGIC ACQUISITIONS, INC., Burbank, CA (US)

( * ) Notice: Subject to any disclaimer, the term of this patent is extended or adjusted under 35 U.S.C. 154(b) by 0 days.

(21) Appl. No.: 13/217,188

(22) Filed: Aug. 24, 2011

(65) Prior Publication Data

US 2013/0054513 A1    Feb. 28, 2013

(51) Int. Cl.
*G06F 7/00* (2006.01)
*G06Q 30/08* (2012.01)
*G06F 17/30* (2006.01)

(52) U.S. Cl.
CPC .......... *G06Q 30/08* (2013.01); *G06F 17/30893* (2013.01)

(58) Field of Classification Search
CPC ............... G06F 8/10; G06F 17/30144; G06F 17/30893; G06F 17/30997
USPC .................................. 707/607, 705, 736, 737
See application file for complete search history.

(56) References Cited

U.S. PATENT DOCUMENTS

| | | | |
|---|---|---|---|
| 4,799,156 A | 1/1989 | Shavit et al. | |
| 5,456,473 A | 10/1995 | Whitney | |
| 5,966,699 A | 10/1999 | Zandi | |
| 6,263,321 B1 | 7/2001 | Daughtery, III | |
| 6,266,651 B1 | 7/2001 | Woolston | |
| 6,285,989 B1 | 9/2001 | Shoham | |
| 6,684,196 B1 * | 1/2004 | Mini et al. | 705/14.34 |
| 6,778,968 B1 | 8/2004 | Gulati | |
| 7,089,202 B1 | 8/2006 | Noland | |
| 7,130,825 B2 | 10/2006 | Vlahoplus et al. | |
| 7,146,337 B1 | 12/2006 | Ward et al. | |
| 7,249,055 B1 | 7/2007 | Elder | |
| 7,281,133 B2 | 10/2007 | Ginter et al. | |
| 7,292,994 B2 | 11/2007 | Prokoski | |
| 7,330,826 B1 | 2/2008 | Porat et al. | |
| 7,346,566 B2 | 3/2008 | Cooper et al. | |
| 7,403,911 B2 | 7/2008 | Guler et al. | |
| 7,415,436 B1 | 8/2008 | Evelyn et al. | |
| 7,480,621 B1 | 1/2009 | Megiddo | |
| 7,499,885 B2 | 3/2009 | Danpour | |
| 7,526,444 B2 | 4/2009 | Miles et al. | |
| 7,546,268 B1 | 6/2009 | DiGiovanni et al. | |
| 7,584,124 B2 | 9/2009 | Porat et al. | |
| 7,593,866 B2 | 9/2009 | Grove et al. | |
| 7,613,633 B1 | 11/2009 | Woolston | |
| 7,644,034 B2 | 1/2010 | Evelyn et al. | |
| 7,647,261 B2 | 1/2010 | Merton et al. | |
| 7,647,270 B2 | 1/2010 | Evelyn et al. | |
| 7,680,773 B1 * | 3/2010 | Acharya et al. | 707/737 |
| 7,698,398 B1 | 4/2010 | Lai | |
| 7,702,540 B1 | 4/2010 | Woolston | |
| 7,711,619 B2 | 5/2010 | Merton et al. | |
| 7,720,770 B1 | 5/2010 | Morimoto | |
| 7,725,359 B1 | 5/2010 | Katzfey et al. | |

(Continued)

*Primary Examiner* — Hung T Vy

(74) *Attorney, Agent, or Firm* — Dentons US LLP

(57) ABSTRACT

Foreclosure auction information received from each of a plurality of sources of such information via respective Internet bots, manual updates, or other sources, is used to populate a database according to a predefined schema and ruleset. The database is updated in near real time (from any or all of the datasources), and actionable auction information that meets user-determined criteria for accuracy, timeliness and/or relevancy is extracted from the database and presented for use by a user.

18 Claims, 7 Drawing Sheets

(56) References Cited

U.S. PATENT DOCUMENTS

| | | | | |
|---|---|---|---|---|
| 7,729,949 | B2 | 6/2010 | Heaton et al. | |
| 7,734,518 | B2 | 6/2010 | Toffey | |
| 7,747,526 | B1 | 6/2010 | Palumbo et al. | |
| 7,755,790 | B2 | 7/2010 | Henry et al. | |
| 7,778,882 | B2 | 8/2010 | Chatter et al. | |
| 7,783,555 | B2 | 8/2010 | Watt, II et al. | |
| 7,814,213 | B2 | 10/2010 | Franklin et al. | |
| 7,831,477 | B2 | 11/2010 | Woolston | |
| 7,831,693 | B2 | 11/2010 | Lai | |
| 7,836,197 | B2 | 11/2010 | Isaac et al. | |
| 7,853,515 | B2 | 12/2010 | Harrison, Jr. | |
| 7,870,055 | B2 | 1/2011 | Fisher et al. | |
| 7,873,569 | B1 | 1/2011 | Cahn | |
| 7,877,319 | B2 | 1/2011 | Miles et al. | |
| 7,881,948 | B2 * | 2/2011 | Carr et al. | 705/1.1 |
| 7,881,979 | B2 | 2/2011 | Shaer | |
| 7,890,413 | B2 | 2/2011 | Sternberg | |
| 7,895,116 | B2 | 2/2011 | Chatter et al. | |
| 7,904,346 | B2 | 3/2011 | Grove et al. | |
| 7,908,182 | B1 | 3/2011 | Gupta | |
| 7,937,312 | B1 | 5/2011 | Woolston | |
| 7,945,509 | B1 | 5/2011 | Chatter et al. | |
| 7,958,013 | B2 | 6/2011 | Porat et al. | |
| 7,970,652 | B1 | 6/2011 | Woolston | |
| 7,983,977 | B2 | 7/2011 | Fisher et al. | |
| 7,987,117 | B2 | 7/2011 | Mozley et al. | |
| 7,996,296 | B2 | 8/2011 | Lange | |
| 8,001,012 | B2 | 8/2011 | Thomas et al. | |
| 8,024,349 | B1 * | 9/2011 | Shao et al. | 707/769 |
| 8,442,921 | B2 * | 5/2013 | Wohlstadter et al. | 705/313 |
| 8,601,326 | B1 * | 12/2013 | Kirn | 714/46 |
| 2002/0049738 | A1 * | 4/2002 | Epstein | 707/1 |
| 2004/0243507 | A1 * | 12/2004 | Deane et al. | 705/38 |
| 2005/0096926 | A1 * | 5/2005 | Eaton et al. | 705/1 |
| 2007/0053513 | A1 * | 3/2007 | Hoffberg | 380/201 |
| 2007/0233692 | A1 * | 10/2007 | Lisa et al. | 707/10 |
| 2007/0233730 | A1 * | 10/2007 | Johnston | 707/104.1 |
| 2008/0097767 | A1 * | 4/2008 | Milman et al. | 705/1 |
| 2009/0221312 | A1 * | 9/2009 | Franklin | 455/466 |
| 2009/0292677 | A1 * | 11/2009 | Kim | 707/3 |
| 2009/0299998 | A1 * | 12/2009 | Kim | 707/5 |
| 2010/0045517 | A1 * | 2/2010 | Tucker et al. | 342/357.08 |
| 2011/0258101 | A1 * | 10/2011 | Albertelli et al. | 705/37 |

* cited by examiner

METHOD AND SYSTEM FOR AUCTION INFORMATION MANAGEMENT

FIELD OF THE INVENTION

The present invention relates to auction information management systems, and, in particular, to such systems and methods in which auction data is acquired from a plurality of data sources and automatically parsed in order to extract actionable auction information in near real time.

BACKGROUND

A substantial volume of sales transactions is conducted by way of real-time auctions where multiple auction participants, (e.g., buyers, or bidders) compete with each other to be the winning bidder for the purchase of real or personal property. For example, real estate foreclosures are conventionally carried out on the "courthouse steps" in an environment requiring bidders to make real time decisions in the face of a dynamic information environment. Among the information parameters that may rapidly change, knowledge of which would aid in an intelligent bidding decision, are availability, price history and current price of comparable properties, value of money, interest rate on money, rent, local marketing data, census data and expected growth areas.

Information about a particular auctioned item may exist in the public domain, or in various proprietary databases maintained by third party data aggregators. Such information is generally not satisfactory for informed real time decision making by an auction participant, and therefore is not actionable, because of a lack of assurance that the information was accurately recorded or currently updated.

As a result, improved methods for providing actionable auction information in near-real time are desirable.

SUMMARY OF THE INVENTION

The present inventor has recognized that the foregoing problem may be mitigated, and an improved method for managing auction information provided, with a computer implemented technique of populating and updating a database with auction information. The auction information may be gathered automatically or semi-automatically by software robots ("Internet bots") which, in real or near real time, return, to the database, updated data from a variety of data sources. Moreover, the data so gathered may be automatically parsed, in accordance with a predefined schema, to, for example, correct errors in the data, eliminate redundant information, and emphasize only the information relevant to a particular user/auction participant and/or auctioned item.

In one embodiment of the present invention, foreclosure auction information, may be managed by deploying, to each of a plurality of sources of foreclosure property information datasources, a respective Internet bot; receiving, from each said Internet bot respective input datasets, each said input dataset relating to at least one real estate foreclosure auction event; populating a database with information parsed from said input datasets according to a predefined schema and ruleset; updating information stored in the database in near real time by incorporating information extracted from updated input datasets received from respective ones of the Internet bots deployed at one or more of the data sources (and/or by manually entering the updated information and/or by receiving same from other sources); and presenting actionable auction information extracted from the database, the actionable auction information meeting user-determined criteria for accuracy, timeliness and/or relevancy.

In such instances, the ruleset may include user-defined criteria to (i) mitigate data errors and redundancies in information stored in the database, (ii) delete irrelevant information from the database, and/or (iii) delete information of doubtful accuracy from the database; parsing of the input datasets may include collating information from the data sources to eliminate redundancies, and categorizing the information; and/or the schema defines different notations for common features present in the information.

The information stored in the database may be updated at user-defined intervals, and the actionable auction information presented upon updating of information concerning a subject property of interest. In some instances, specifications of properties of interest may be used as inputs to extract information concerning similar, available properties from the database, and the information regarding properties of interest may be ranked by user interest level.

In some cases, information obtained by the Internet bots may be first transferred to a web form, prior to being stored as a dataset in the database. Such a web form may be configured to organize the information according to the schema. Parsing the information from the input datasets may include categorizing the information by fields and/or by user-defined criteria for properties of interest. Updating the information stored in the database may include determining whether or not a record for a property already exists in the database and, if so, updating the record to reflect newly obtained information from one of the datasources, otherwise, creating a new record for the property and populating the new record with information obtained from one of the datasources.

Further details of these and other embodiments of the invention are described below.

BRIEF DESCRIPTION OF THE DRAWINGS

The present invention is illustrated by way of example, and not limitation, in the figures of the accompanying drawings, in which.

DETAILED DESCRIPTION

Figure 1:
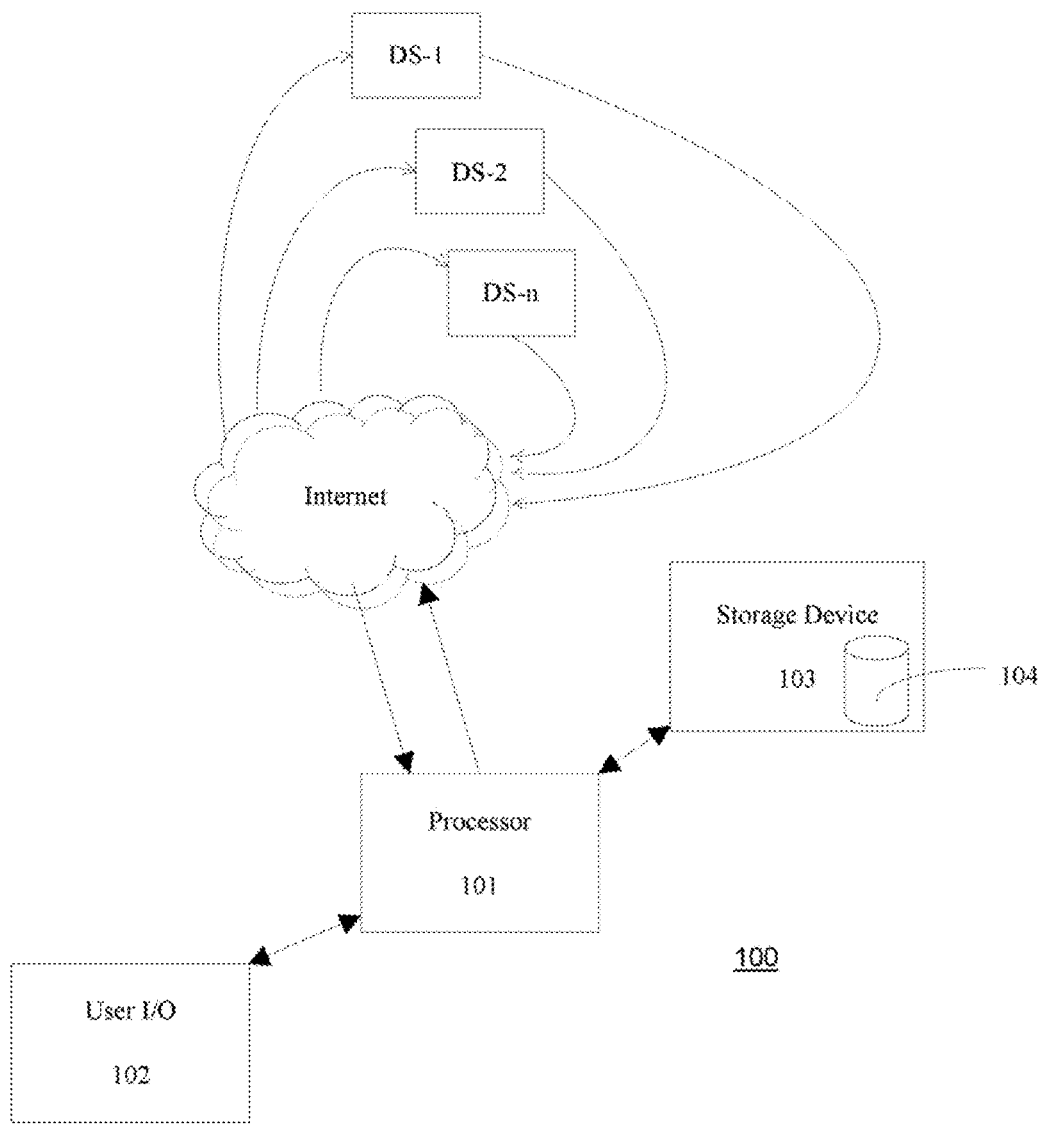
FIG. 1 illustrates an exemplary system upon which an embodiment of the invention may be practiced.

Described herein are methods and systems for auction information management, and, more particularly for presenting to an auction participant ("user"), in near real time, actionable auction information extracted from a database, the database being automatically populated and updated from a plurality of data sources. As used herein, and in the claims, "actionable auction information" means information that has been acquired through the processes described herein, and which meets user-determined criteria for accuracy, timeliness, and relevancy.

As will become evident from the discussion below, various embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

In view of the above, it should be appreciated that some portions of the description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of an appropriately programmed computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a computer system that is selectively activated or reconfigured by a computer program which it executes and which is stored on one or more computer-readable storage mediums accessible to processing elements of the computer system. For example, such a computer program may be stored in a computer readable storage medium, such as, but not limited to, any type of disk including floppy disks, optical disks, compact disk read only memories (CD-ROMs), and magnetic-optical disks, read-only memories (ROMs), flash drives, random access memories (RAMS), erasable programmable read only memories (EPROMs), electrically erasable programmable read only memories (EEPROMs), flash memories, other forms of magnetic or optical storage media, or any type of media suitable for storing electronic instructions, and each accessible to a computer processor, e.g., by way of a system bus or other communication means.

The algorithms and processes presented herein are not inherently related to any particular computer system, processor or other apparatus. Various electronic computing apparatus, along with, where necessary, suitable computer programs that instantiate processes in accordance with the teachings herein, may be used. For example, any of the present methods can be implemented in hard-wired circuitry, by appropriate programming of a computer processor or processors, or any combination of hardware and software may be used to carry out the methods discussed below. Of course, the invention can be practiced with computer system configurations other than those particularly described below, including systems that comprise hand-held devices, multiprocessor systems, microprocessor-based electronic devices, digital signal processor-based devices, networked computer systems, minicomputers, mainframe computers, personal computers, and the like, and it should be recognized that these examples presented herein are used merely for purposes of illustration. The invention can also be practiced in distributed computing environments where tasks are performed by computer processing devices that are remote to one another, either physically and/or logically, and are linked through one or more communications networks. The required structure for a variety of these systems will appear from the description below.

Referring now to FIG. 1, a system 100 adapted to present to a user, in near real time, actionable auction information extracted from a database, wherein the database is automatically populated and updated from a plurality of data sources, is shown. System 100 includes a processor 101 that is communicatively coupled to a database 104, database 104 being stored on a data storage device 103, and to a user input/output (I/O) interface 102. Data storage device 103 may consist of a computer readable storage device, such as, but not limited to, any type of storage device described above. Database 104 may be a structured query language (SQL) database or other form of database.

In some instances, processor 101 may be communicatively coupled over one or more communications networks (e.g., the network of networks knows as the Internet) to each of a plurality of data sources, DS-1, DS-2 . . . DS-n, selected (e.g., in advance of any auction events or even during an auction event) by a user. Each such data source DS-n may be, for example, a website operated by a third party aggregator of data relevant to an auction event. For example, in the context of a real estate foreclosure auction, the data sources may be selected from commercial websites such as fidelityasap.com, realquest.com, priofityposting.com, loanstartrustee.com, etc. Advantageously, processor 101 may deploy, via the Internet, one or more software robots ("Internet bats") to each of the plurality of data sources and thereafter receive, from each such Internet bot, an input dataset obtained by the bot from the data source, e.g., DS-n. Hence, processor 101 may execute software having an application programming interface (API) or other communication interface that is adapted to receive such information from the individual bots. The information may be so provided to processor 101 (i.e., to an application running thereon) in any convenient format, and in either encrypted or plain text form.

Each input dataset may consist of data relevant to an auction event (e.g., a foreclosure auction event). For example, an input dataset may include a list of real properties scheduled to undergo foreclosure auctions, images (e.g., photos) of the subject properties, floor plans, crime statistics, investor information (e.g., previous buys or dislikes for potential inventors in the properties), comparable sales information, tax information, foreclosure information for properties in the area of the subject properties, successful sales information, etc. Such an input dataset may further associate, with each real property on the list, a respective appraiser's parcel number ("APN"), trustee sale number ("TSN"), street address, loan number, auction date, auction location, and/or other relevant information. This information may be gathered from a number of different data sources through the use of the Internet bots. In addition, really simple syndication (RSS) feeds and manual data input based on review of hard copy and other data sources may be used as data collection means to populated database 104.

Processor 101 may be adapted to store the input datasets in data storage device 103, and to initially populate database 104 with information from the input datasets. Advantageously, database 104 may have a predefined schema, and processor 101 may parse the input datasets according to the schema and/or according to a predefined rule set to obtain the information with which the initial database is populated. Examples of processes for accomplishing the these tasks are described below.

Processor 101 may be further adapted to update database 104 by, for example, integrating therein an updated input dataset, received over the communications network from one or more of the data sources. For example, processor 101 may receive from one or more of the deployed Internet bots, updated input datasets on a periodic or continuous basis. These updates may be used to update the information reflected in database 104 Actionable auction information extracted from database 104, e.g., under the control of processor 101, may be displayed on a monitor display or similar unit (e.g., using an appropriate user interface to present the information in a fashion convenient for the user) and/or printed in hard copy.

Figure 2:
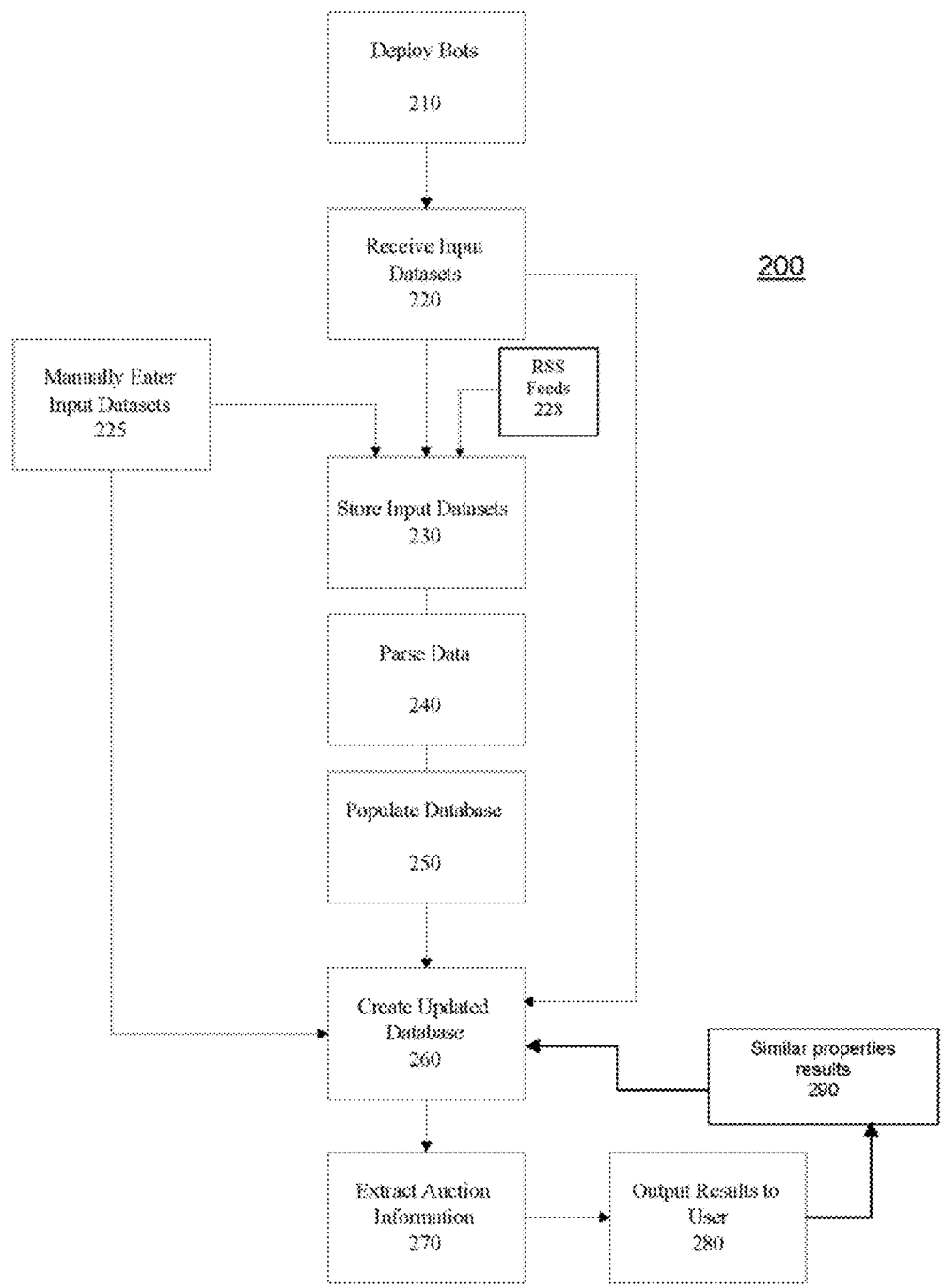
FIG. 2 is a flow diagram illustrating a process for auction information management in accordance with an embodiment of the present invention.

Referring now to FIG. 2, a process 200 for collecting information and populating database 104 is illustrated. At step 210, Internet bots are deployed to a plurality of data sources, DS-1, DS-2, . . . and DS-n. Input datasets consisting of information obtained by each Internet bot from a respective data source, along with manually entered data (225) and/or RSS data feeds (228) is received (220) and temporarily stored (230). The input datasets may include information relating to real estate foreclosure auction events.

At step 240, information from the input datasets is parsed. For example, information from the disparate data sources may be collated, so as to eliminate redundancies, and categorized. In addition, a rule set may be applied to the information, so as to detect and eliminate errors and redundant records, and to delete irrelevant information and/or information of doubtful accuracy. Finally, the information may be structured according to a user-defined schema of a database, before being used to populate the database (250). The schema may define, for example various spidered websites notations for the number of bedrooms (e.g., identified as "bdrm" or "Bedroom" or "beds"), etc. This process continues, along with optional manual updates (225) to the database, so that the database is continually updated (260) to reflect as near real time information as possible or practical. For example, the updates may be performed at user-defined intervals (e.g., fifteen second intervals) so that database 104 may be continuously refreshed in near real time from a plurality of data sources.

Auction information may be extracted (270) from the updated database and output (280) to the user (e.g., in any of a variety of actionable forms, either being displayed on a monitor, printed in hard copy, sent as an electronic message, etc., or combinations of these means). For example, results may be output to the user upon updating of a record (e.g., when a record moves from "pass" status to "awaiting" status).

Information is actionable by a user when it meets user-determined criteria for accuracy, timeliness and/or relevancy. In some cases, specifications of previous purchased properties or properties of interest may be used as inputs (290) to extract similar, available properties (i.e., information concerning same) from the database. Also, the information regarding similar properties and/or properties of interest may be presented for ranking by the user (e.g., ranking by interest level) and that ranking information used to update the database so that decisions about which candidate properties to extract in response to user queries can be tailored accordingly.

Figure 3:
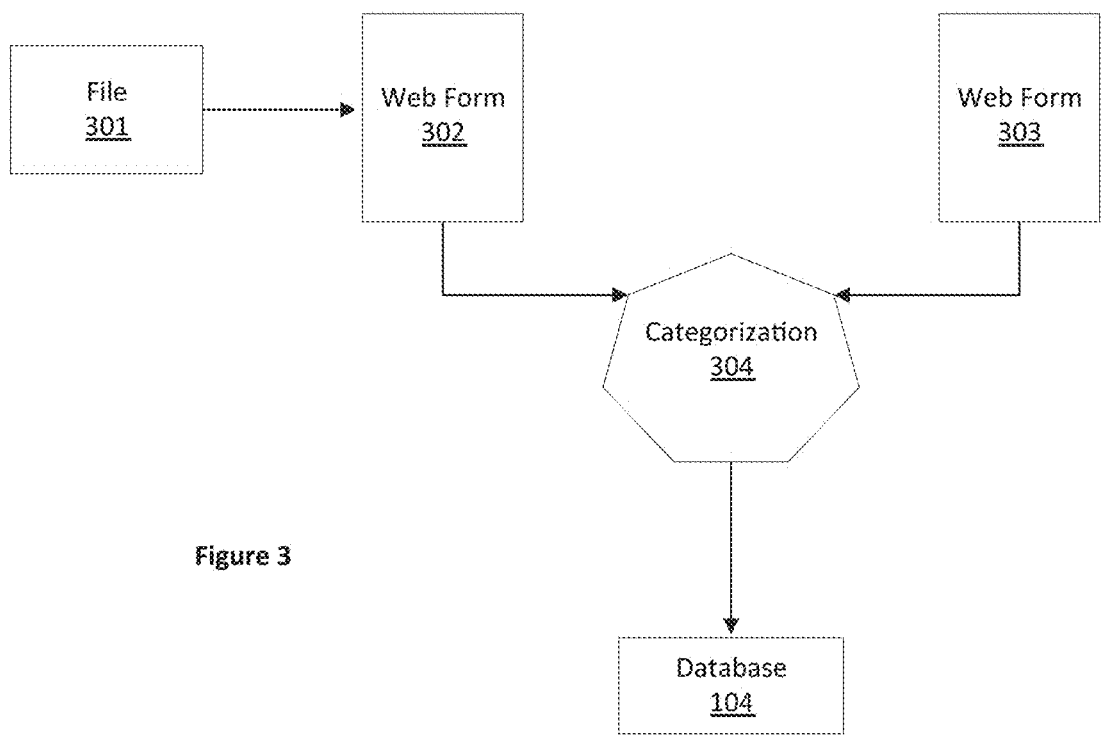
FIG. 3 illustrates an aspect of receiving and parsing input datasets in accordance with an embodiment of the present invention.

In order to further explain the systems and methods outlined above, consider the example of a real estate foreclosure auction and refer first to FIG. 3. In this example, an input dataset may be extracted from a file 301 obtained by an Internet bot from a data source, DS-n. Information from file 301 is transferred to a web form 302, prior to being stored in database 104. In one embodiment, web form 302 may permit information from a plurality of different data sources, each of which may organize information in disparate formats, to be organized in a uniform manner, e.g., according to a schema selected by the user for recording datasets in database 104. Other web forms 303 may also be provided for manual input of foreclosure records or other information to be stored in database 104.

In the embodiment illustrated in FIG. 3, the data parsing process step 240 discussed with reference to FIG. 2 may include a categorization process 304, which is discussed in detail below. After categorization, database 104 may be populated with the input datasets.

Figure 4:
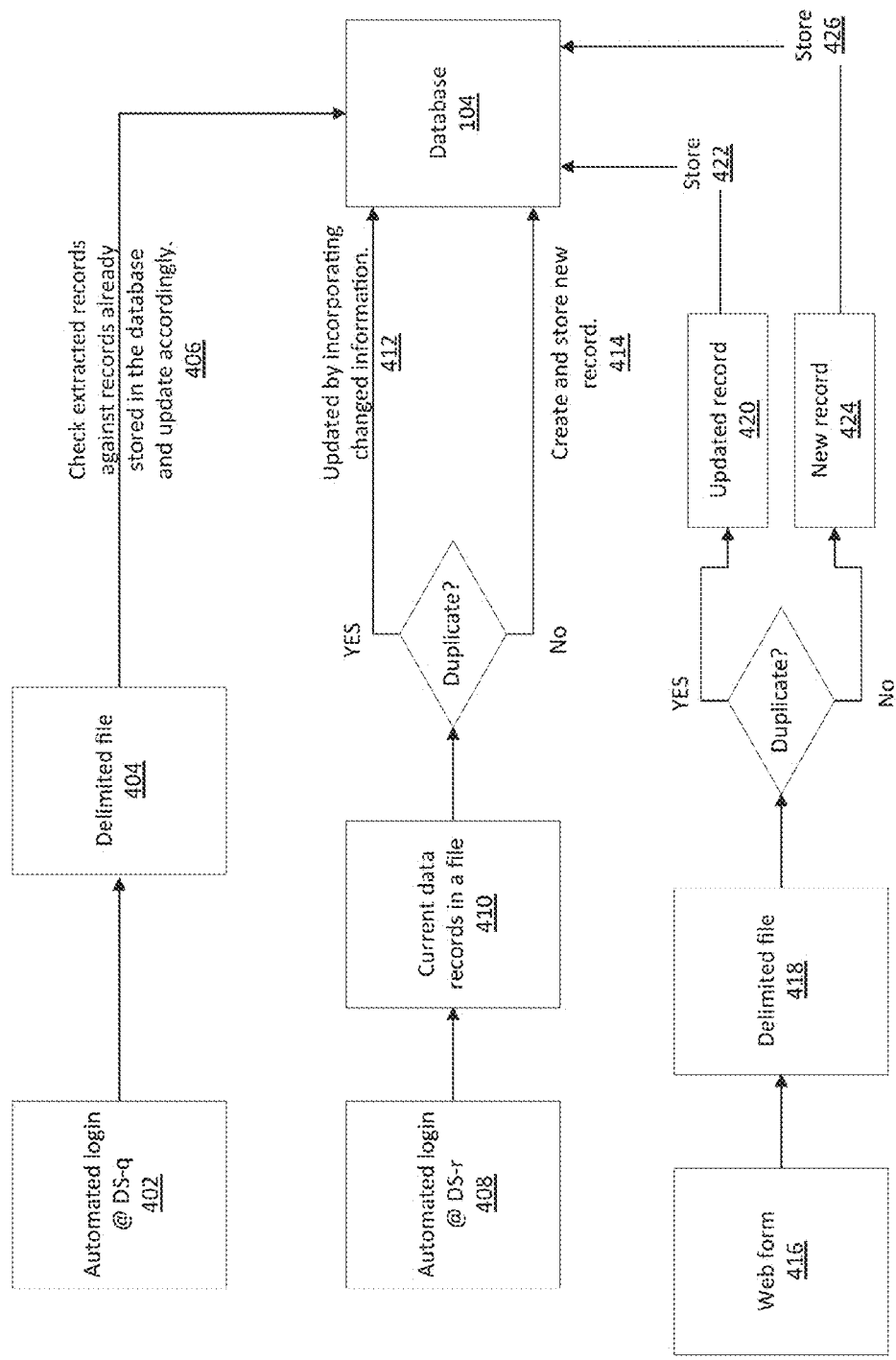
FIG. 4 illustrates an aspect of receiving and parsing input datasets in accordance with another embodiment of the present invention.

Referring now to FIG. 4, a further example of the above-described process is illustrated. Here, an automated login service may be executed by an Internet bot at a data source DS-q 402. From data source DS-q, input datasets consisting of one or more delimited files with auction information may be acquired and records 404 extracted from those files (e.g., according to the data parsing process described with reference to FIG. 2). The extracted records may be checked against records already stored in the database 406 and, for instances where a existing data records for the subject property(ies) already exist, changes to those current record as reflected in the extracted records may be made. Otherwise, the new records may be stored in the database.

In other instances, an automated login service may be executed by an Internet bot at a data source DS-r 408, and data records 410 obtained therefrom (e.g., according to the data parsing process described with reference to FIG. 2). The resulting records may be associated with, for example, a respective APN, TSN, and/or other convenient identifier, and checked against records already stored in database 104 on that basis (e.g., for instances of existing data records for the subject property). In the case of a duplicate record, the existing record may be compared with a new record, and updated by incorporating any changed information 412. Otherwise, the new record may be written to the database 414.

In still further instances, a web form 4'16 may be used to capture data entered manually and to produce a delimited file 418 with auction information. Based on the data from the file, the database is queried to determine whether information concerning the subject property(ies) already exists. If so, updated data records 420 are created and stored in the database 422. Otherwise, new data records 424 are created and stored to the database 426. In the case where existing records are being updated, the updates may be first posted to a review table, where a user can review and approve the changes before they are committed to the database. If desired, a similar procedure may be used for new records.

In some instances, different data source may reflect different information concerning a subject property. When, for a particular property (e.g., as identified by APN or TSN), an information inconsistency is identified, such inconsistency may be corrected automatically according to a user-defined ruleset, as described below. The ruleset applies user-defined criteria to (i) mitigate data errors and redundancies, (ii) delete irrelevant information, and (iii) delete information of doubtful accuracy.

Figure 5:
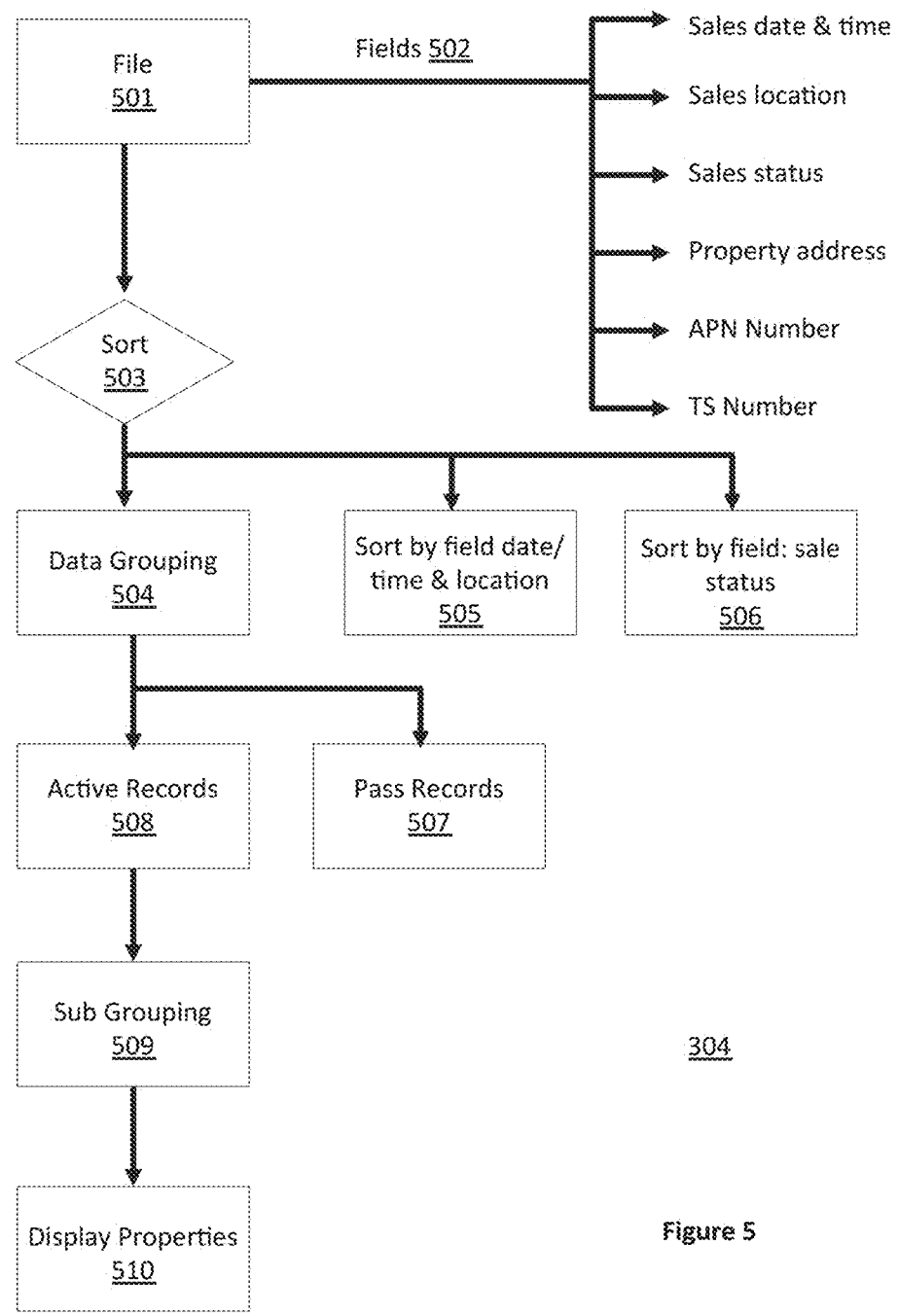
FIG. 5 illustrates an aspect of parsing input datasets in accordance with an embodiment of the present invention.

Referring now to FIG. 5, an example of categorization process 304 is illustrated. Input datasets, whether they reflect data that was entered manually or received from data sources though the use of Internet bots, may generally consist of a number of records 501. In the example of a real estate foreclosure auction, each record may relate to a respective property as identified, for example by APN and/or TSN. Each record may consist of a group of fields 502. For example, a field for each of sale date and time, sale location, sale status, property address, APN and TSN may be provided. Records may be sorted 503 by one or more fields, for example, by sale date/time and location 505 and/or by property sale status 506.

Records may also be grouped 504 by one or more user-defined criteria. For example, records associated with properties not meeting a user-defined criteria, may be categorized as "pass" records 507. Records associated with properties meeting the user-defined criteria, on the other hand, may be categorized as an "active" records 508. Advantageously, active records may undergo sub grouping 509, so that, for example, only active properties having a user-defined auction time, date and location are displayed 510.

Figure 6:
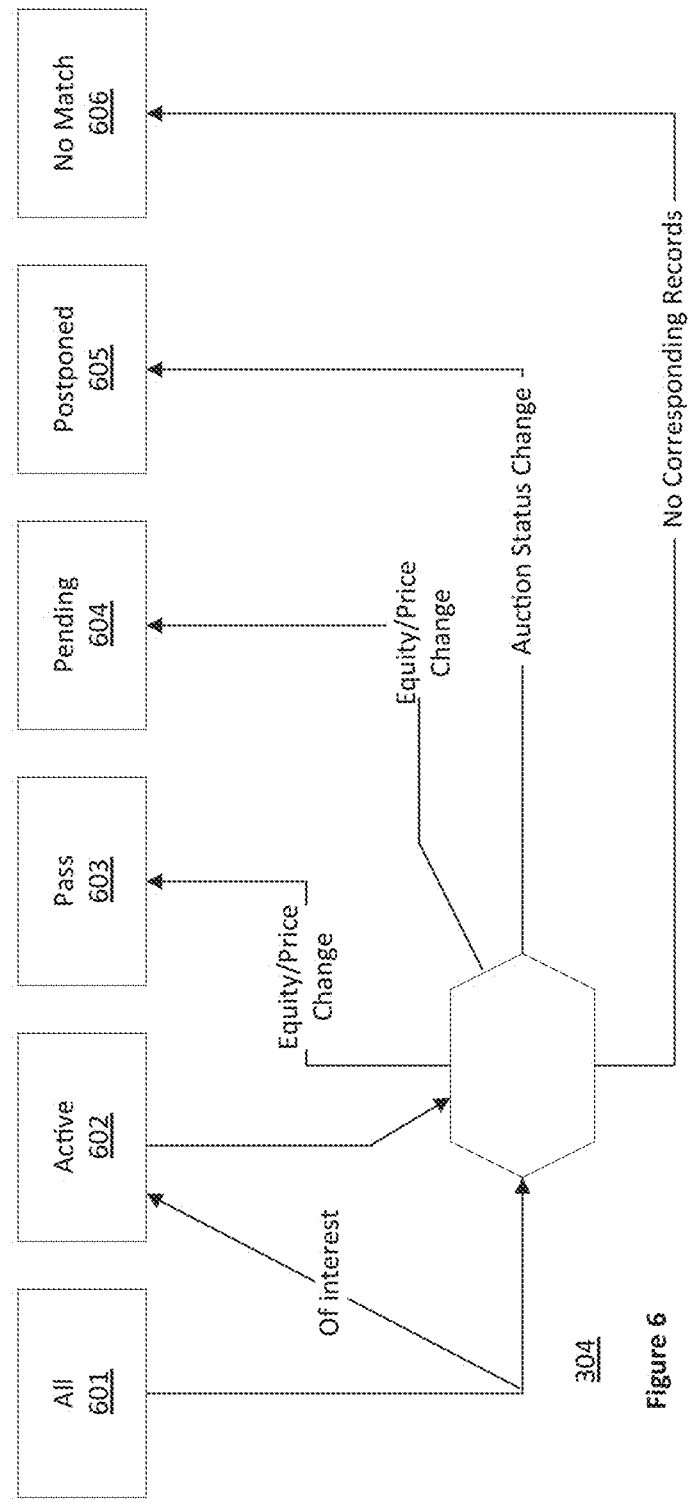
FIG. 6 illustrates an aspect of parsing input datasets in accordance with another embodiment of the present invention.

Referring now to FIG. 6, a further example of categorization process 304 is illustrated. Records of input datasets from any number of data sources may initially be categorized as "All" 601. A record associated with property of interest to the user may subsequently be manually categorized by the user as "Active" 602. Whether or not a record is categorized as Active, records may be further categorized when updated input datasets are received. For example, if a record of an updated input dataset indicates a change in an associated property's equity or price meet a certain user defined criteria, the record may be categorized as "pass" 603 or "pending" 604. For example, if a property equity percentage change is less than a user defined criteria, an associated record may be categorized as "pass" 603; if a property's percentage price change is more than a user defined criteria, an associated record may be categorized as "pending" 604.

In some instances, an updated input dataset may indicate a change in a property's auction status, e.g., as postponed or canceled, in which case, the associated record may be categorized as "postponed" 605. In other instances, an updated input dataset may not include an update to some records already in database 104, in which case such records may be categorized as "no match" 606.

Figure 7:
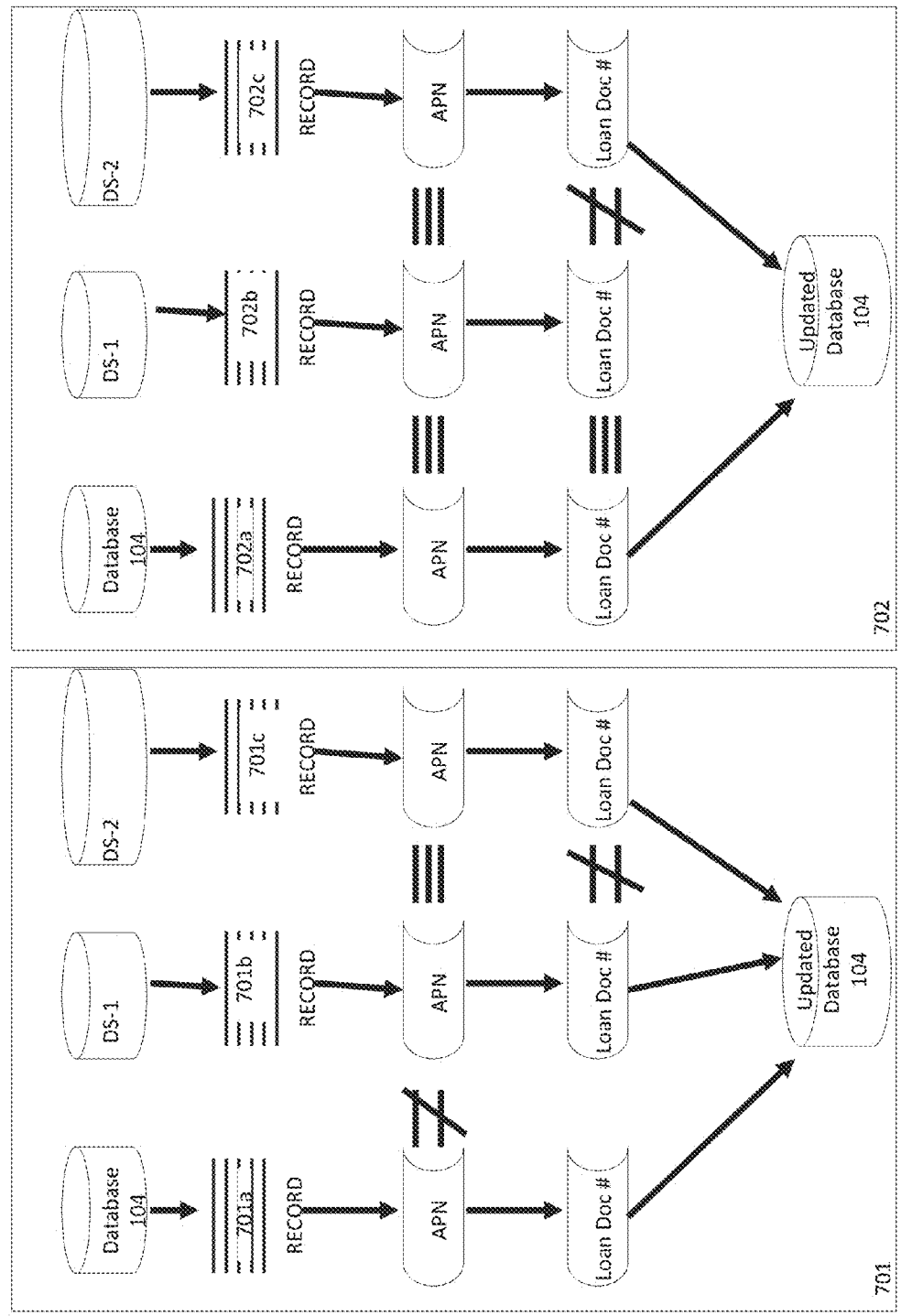
FIG. 7 illustrates an aspect of parsing input datasets in accordance with further embodiment of the present invention.

As noted above, input datasets may be parsed in accordance with a user-defined ruleset before being input to database 104. An example of such a ruleset is illustrated in FIG. 7, which demonstrates how, for example, a ruleset may be defined to prevent redundant data records from being entered into database 104.

In block 701, application of a rule to a data record is illustrated. In particular, a record 701a from database 104 is compared to a record 701b received from data source DS-1 and a record 701c received from data source DS-2. It may be noted that records 701b and 701c have an identical APN which is different from the APN of record 701a. It may be further noted that record 701b has a loan document number that is different than the loan document number of record 701c. As a result, application of the rule determines that each of records 701a, 701b and 701c are distinct (i.e., are not redundant) and the updated database 104 will include each of the subject records.

In block 702, a further example of application of the rule is illustrated. In this case, a record 702a from database 104 is compared to a record 702b received from data source DS-1 and a record 702c received from data source DS-2. It may be noted that records 702a, 702b, and 702c each have an identical APN. It may be further noted that record 702b has a loan document number that is identical to the loan document number of record 702a, but different than the loan document number of record 702c. As a result, application of the rule determines that record 702b is redundant to record 702a, but that record 702c is distinct (i.e., is not redundant). As a result, the updated database 104 will include records 702a and 702c, but not record 702b.

Of course, the above examples are intended only for purposes of illustrating the processes discussed herein and in practice it is likely that more complicated rulesets will be applied to the data records. For example, rulesets to correct errors within a received updated input dataset, and to rank records in terms of relevancy, using user-defined criteria are contemplated for use in connection with the present invention. In general, the rulesets may instantiate user-defined criteria to (i) mitigate data errors and redundancies in information stored in the database, (ii) delete irrelevant information from the database, and/or (iii) delete information of doubtful accuracy from the database.

It was noted above that the database 104 may be continuously (or nearly continuously) updated to reflect the most currently available information regarding the subject properties. This may involve the user may setting a time interval for obtaining live sale status and price updates from one or more data sources DS-n. The Internet bots may be programmed such that, upon executing their respective automated logins, searches are conducted only for records having updated values for price and/or sale status. Records having such status changes may be matched, e.g., by TSN, APN, or address in database 104, and saved. As a result of the updated values, records may be regrouped/recategorized. In addition to records of actual properties to be auctioned, Internet bots may programmed such that, upon executing their respective automated login service, records of comparable sales may be obtained. For example, for each comparable sale, an associated street map location and property details may be obtained and stored in database 104.

The categorization of a record may be changed in real time as a result of, for example, a change in property price. Accordingly, a property previously categorized as "pass" may be recategorized as "active", and vice-versa, as a result of a price change. Such recategorization may be executed automatically, semi-automatically or manually.

In addition to permitting raw data to be extracted from the database, the present system is also configured to provide data analysis for the user. For example, using the data stored in database 104, processor 101 may calculate the debt service for a subject property (i.e., the monthly, yearly or other mortgage payments and taxes due, capital gains taxes or realizations from sales at current market conditions, realtor fees and administration overhead). Also, processor 101 may calculate equity ranges in a subject property, various potential returns on investments (e.g., based on historical prices), tranche classifications for packaging for private placements, amounts of possible equity taps, and estimates of rehabilitation funds for a subject property. Of course, other metrics and estimates may also be computed using the available data.

Thus, methods and systems for auction information management, and, more particularly for presenting actionable auction information extracted from a database in near real time have been described.

What is claimed is:

1. A method for managing foreclosure auction information, the method comprising the steps of:
    deploying, by a processor and via a communications network, to each of a plurality of foreclosure property information data sources, a respective Internet bot;
    receiving, by the processor, from each Internet bot a respective input dataset, each input dataset relating to at least one real estate foreclosure auction event;
    parsing, by the processor, information from the received input datasets, the information including a plurality of records associated with a respective plurality of properties, the parsing step including categorizing the information according to at least user-defined criteria for properties of interest, and the categorizing step including grouping the plurality of records into at least a first group of records and a second group of records, the first group of records being associated with properties categorized as having an active status, the active status indicating that a record is associated with a property meeting the user-defined criteria, and the second group of records being associated with properties being categorized as having a pass status, the pass status indicating that a record is associated with a property not meeting the user-defined criteria;
    populating, by the processor, a database with information parsed from the input datasets according to a predefined schema and ruleset;
    updating, by the processor, information stored in the database by incorporating into the database information extracted from updated input datasets received from respective ones of the Internet bots, the updating step including (i) updating the active or pass status of one or more of the plurality of records based on the information extracted from the updated input datasets, and (ii) automatically re-categorizing the one or more records in accordance with a change in the status of the record;
    presenting, by the processor, actionable auction information extracted from the database,
    wherein the populating step comprises:
        executing, by the processor, a first comparison of a parsed record from a first input dataset and a parsed record from a second input dataset to the records in the database based at least in part on a first unique identifier associated with each of the records;
        executing, by the processor, a second comparison of the parsed record from the first input dataset to the parsed record from the second input dataset based at least in part on the first unique identifier and a second unique identifier associated with each of the records; and
        populating, by the processor, the database with the parsed record from the first input dataset and the parsed record from the second input dataset when a result of each of the first and second comparison indicates that the parsed records from the first and second input datasets and the records in the database are distinct.

2. The method of claim 1, wherein the parsing step further includes collating information in the received input datasets to eliminate redundancies.

3. The method of claim 1, wherein the predefined schema defines different notations for common features present in the information.

4. The method of claim 1, further comprising the step of updating the information stored in the database manually.

5. The method of claim 1, further comprising the step of updating the information stored in the database by incorporating information received from really simple syndication (RSS) feeds.

6. The method of claim 1, wherein the information stored in the database is updated at user-defined intervals.

7. The method of claim 1, wherein the actionable auction information is presented upon updating of information concerning a subject property of interest.

8. The method of claim 1, wherein specifications of the properties of interest are used as inputs to extract from the database information concerning properties that are available or similar.

9. The method of claim 8, wherein the information regarding the properties of interest is ranked according to a user interest level.

10. The method of claim 1, wherein information obtained by each Internet bot is first transferred to a web form, prior to being stored in the database.

11. The method of claim 10, wherein the web form is configured to organize the information according to the schema.

12. The method of claim 1, wherein the parsing step further includes categorizing the information according to one or more fields.

13. The method of claim 1, wherein the updating step further includes determining whether or not a record for a given property already exists in the database, so that
    if the record for the given property already exists in the database, the record is updated to reflect newly obtained information from one or more of the foreclosure property information data sources, and
    if the record for the given property does not exist in the database, a new record is created and populated with information obtained from the one or more of the foreclosure property information data sources.

14. The method of claim 1, wherein the change in the status of the record is from the active status to the pass status.

15. The method of claim 1, wherein the change in the status of the record is from the pass status to the active status.

16. The method of claim 1, wherein the change in the status of the record is a result of a change in a price of a property associated with the record.

17. The method of claim 1, wherein the change in the status of the record is a result of a change in an equity percentage of a property associated with the record.

18. The method of claim 1, wherein the change in the status of the record is a result of a change in an auction status of a property associated with the record.

* * * * *